United States Patent
Suzuki

(10) Patent No.: US 10,422,878 B2
(45) Date of Patent: Sep. 24, 2019

(54) OBJECT RECOGNITION APPARATUS

(71) Applicant: DENSO CORPORATION, Kariya, Aichi-pref. (JP)

(72) Inventor: Yasuhiro Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 386 days.

(21) Appl. No.: 15/439,310

(22) Filed: Feb. 22, 2017

(65) Prior Publication Data

US 2017/0242125 A1    Aug. 24, 2017

(30) Foreign Application Priority Data

Feb. 23, 2016    (JP) .................................. 2016-032222

(51) Int. Cl.
| | |
|---|---|
| G01S 7/48 | (2006.01) |
| G01S 17/02 | (2006.01) |
| G01S 17/08 | (2006.01) |
| G01S 17/42 | (2006.01) |
| G01S 17/93 | (2006.01) |
| G01S 7/497 | (2006.01) |

(52) U.S. Cl.
CPC ............ G01S 17/08 (2013.01); G01S 7/4802 (2013.01); G01S 7/497 (2013.01); G01S 17/026 (2013.01); G01S 17/42 (2013.01); G01S 17/936 (2013.01)

(58) Field of Classification Search
CPC ...... G01S 17/08; G01S 17/026; G01S 17/936; G01S 7/4802; G01S 7/497
See application file for complete search history.

(56) References Cited

U.S. PATENT DOCUMENTS

| | | | | |
|---|---|---|---|---|
| 6,552,342 | B2* | 4/2003 | Holz | ...................... G01S 7/484 |
| | | | | 250/330 |
| 2009/0122297 | A1 | 5/2009 | Ikeno et al. | |
| 2018/0113200 | A1* | 4/2018 | Steinberg | ................ G01S 7/497 |

FOREIGN PATENT DOCUMENTS

| | | |
|---|---|---|
| JP | S60-181684 | 9/1985 |
| JP | 2002-296350 | 10/2002 |
| JP | 2009-044631 | 2/2009 |
| JP | 2011-043330 | 3/2011 |
| JP | 2011-191227 | 9/2011 |
| JP | 2013-092459 | 5/2013 |
| JP | 2014-089114 | 5/2014 |

* cited by examiner

*Primary Examiner* — Eric L Bolda
(74) *Attorney, Agent, or Firm* — Knobbe, Martens, Olson & Bear, LLP

(57) ABSTRACT

In an object recognition unit, a high-illuminance direction acquisition unit acquires, as a high-illuminance direction range, a range of at least one high-illuminance direction. The at least one high-illuminance direction is a direction in which an intensity of light received by a light-receiving unit when reflected waves are not being received by the light-receiving unit is equal to or greater than a predetermined threshold value. A correction unit corrects a recognition region of an object such that, as viewed from a vehicle, a corrected recognition region of the object includes at least part of the high-illuminance direction range on condition that the recognition region of the object and the high-illuminance direction range have a predetermined positional relationship therebetween.

9 Claims, 9 Drawing Sheets

OBJECT RECOGNITION APPARATUS

CROSS REFERENCE TO RELATED APPLICATIONS

This application is based on and claims the benefit of priority from Japanese Patent Application 2016-32222 filed on Feb. 23, 2016, the disclosure of which is incorporated in its entirety herein by reference.

TECHNICAL FIELD

The present disclosure relates to object recognition apparatuses.

BACKGROUND

The following type of object recognition apparatus is known in the prior art. The object recognition apparatus first measures distances to the surface of an object using a laser radar apparatus, with the distances being acquired as distance measurement points. The object recognition device then performs recognition of the object, by clustering the distance measurement points. Such an object recognition apparatus is disclosed in Japan Patent Publication No. 2011-191227.

SUMMARY

Such a laser radar cannot acquire distance measurement points from directions where there is high-illuminance interference light, such as light from vehicle headlights. For this reason, the laser radar cannot acquire distance measurement points from a part of the object; the part of the object is in a region with high illuminance. This may result in the size of the object, as recognized based on the distance measurement points acquired using the laser radar, being smaller than the actual size of the object.

In view of the circumstances, one aspect of the present disclosure seeks to provide object recognition apparatuses, each of which is capable of solving the problem set forth above.

Specifically, an alternative aspect of the present disclosure aims to provide such object control apparatuses, each of which is capable of recognizing objects with higher accuracy while reducing the adverse effects of high-illuminance optical interference, such as high-illuminance interference light.

According to a first exemplary aspect of the present disclosure, there is provided an object recognition apparatus mountable to a vehicle. The object recognition apparatus includes a light-emitting unit for emitting laser light, and a light-receiving unit for receiving reflected waves, the reflected waves being based on reflection of the laser light from corresponding distance measurement points of an object to be recognized. The object recognition apparatus includes a distance calculation unit that calculates a distance to each of the distance measurement points, based on a corresponding one of the reflected waves, and a direction estimating unit that estimates a direction of each of the distance measurement point with respect to the vehicle, based on a corresponding one of the reflected waves. The object recognition apparatus includes an object recognition unit that recognizes a predetermined recognition region of the object to be recognized, based on the distance measurement points, and a high-illuminance direction acquisition unit that acquires, as a high-illuminance direction range, a range of at least one high-illuminance direction. The at least one high-illuminance direction is a direction in which an intensity of light received by the light-receiving unit without the reflected waves being received by the light-receiving unit is equal to or greater than a predetermined threshold value. The object recognition apparatus includes a correction unit that performs a correction task to correct the recognition region of the object such that, as viewed from the vehicle, a corrected recognition region of the object includes at least part of the high-illuminance direction range on condition that the recognition region of the object and the high-illuminance direction range have a predetermined positional relationship therebetween.

According to a second exemplary aspect of the present disclosure, there is provided an object recognition method including (1) Emitting laser light using a light-emitting unit (2) Receiving reflected waves, the reflected waves being based on reflection of the laser light from corresponding distance measurement points of an object to be recognized (3) Calculating a distance to each of the distance measurement points, based on, for example, a corresponding one of the reflected waves (4) Estimating a direction of each of the distance measurement point with respect to the vehicle, based on, for example, a corresponding one of the reflected waves (5) Recognizing a predetermined recognition region of the object to be recognized, based on the distance measurement points (6) Acquiring, as a high-illuminance direction range, a range of at least one high-illuminance direction, the at least one high-illuminance direction being a direction in which an intensity of light received by the light-receiving unit without the reflected waves being received by the light-receiving unit is equal to or greater than a predetermined threshold value (7) Correcting the recognition region of the object such that, as viewed from the vehicle, a corrected recognition region of the object includes at least part of the high-illuminance direction range on condition that the recognition region of the object and the high-illuminance direction range have a predetermined positional relationship therebetween.

This configuration of each of the first and second exemplary aspects of the present disclosure makes it possible to prevent the size of the recognition region of the object from being smaller than the actual size of the object, even if there is the high-illuminance direction range. That is, each of the first and second exemplary aspects of the present disclosure recognizes objects with higher accuracy while reducing the adverse effects of high-illuminance optical interference, such as high-illuminance interference light.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

The following describes a preferred embodiment of the present disclosure with reference to the accompanying drawings.

(1) Overall Configuration of Object Recognition Apparatus 1

The following describes an example of the overall configuration of the object recognition apparatus 1 according to the preferred embodiment of the present disclosure with reference to FIGS. 1 to 6.

Figure 1:
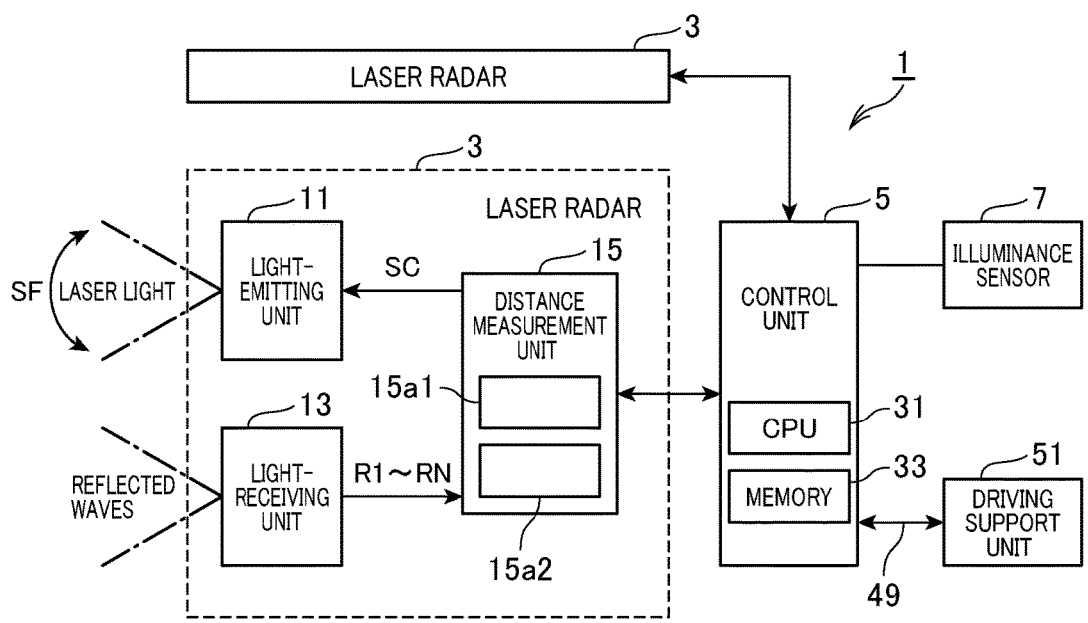
FIG. 1 is a block diagram schematically illustrating an example of the configuration of an object recognition apparatus according to a predetermined embodiment of the present disclosure.

The object recognition apparatus 1 is mounted to a vehicle 9, referred to in the following as the host vehicle 9. As shown in FIG. 1 the object recognition apparatus 1 includes, for example, a pair of laser radars 3, a control unit 5 and an illuminance sensor 7.

(2) Configuration of Laser Radar 3

Figure 2:
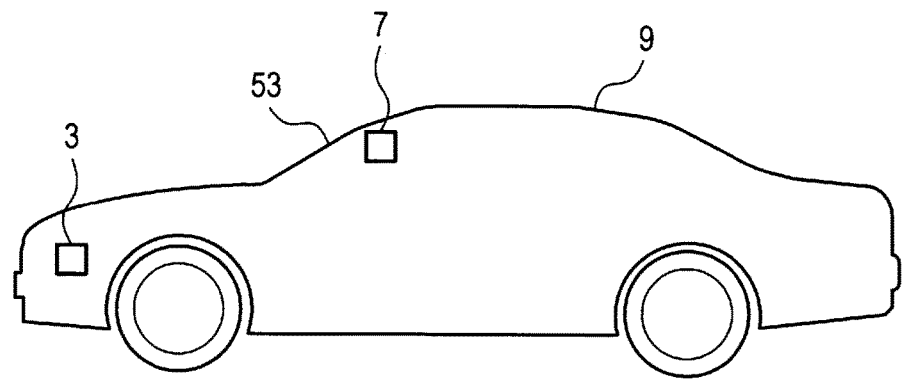
FIG. 2 is a side view schematically illustrating how each laser radar illustrated in FIG. 1 is mounted to a host vehicle according to the predetermined embodiment.

As shown in FIG. 2, each of the laser radars 3 is mounted to the corresponding one of the right surface and left surface of the front end of the vehicle body of the host vehicle 9. As shown in FIG. 1, each of the laser radars 3 includes a light-emitting unit 11, a light-receiving unit 13, and a distance measurement unit 15.

The light-emitting unit 11 corresponds to, for example, a light-emitting unit, the light-receiving unit 13 corresponds to, for example, a light-receiving unit.

Figure 3:
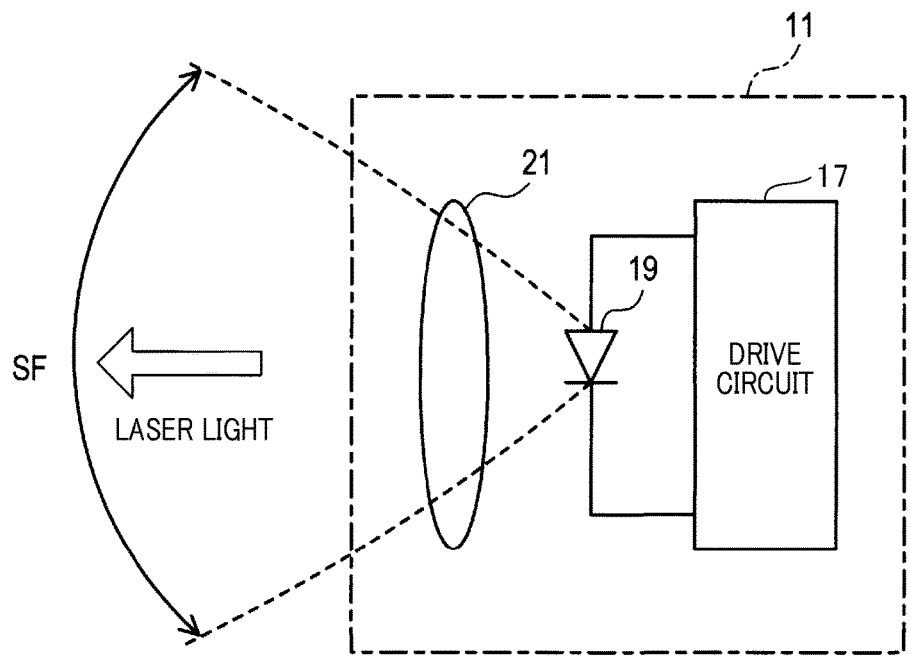
FIG. 3 is a circuit diagram of a light-emitting unit of the laser radar.

As shown in FIG. 3, the light-emitting unit 11 includes a drive circuit 17, a light-emitting element 19, and a collimating lens 21. The drive circuit 17 drives the light-emitting element 19 in accordance with a light-emission control signal SC, which indicates the transmission timings of laser light described later from the light-emitting element 19. As described hereinafter, the light-emission control signal SC is output from the distance measurement unit 15.

The light-emitting element 19 is driven by the drive circuit 17 such as to emit pulsed laser light in accordance with the light-emission control signal SC.

Figure 5:
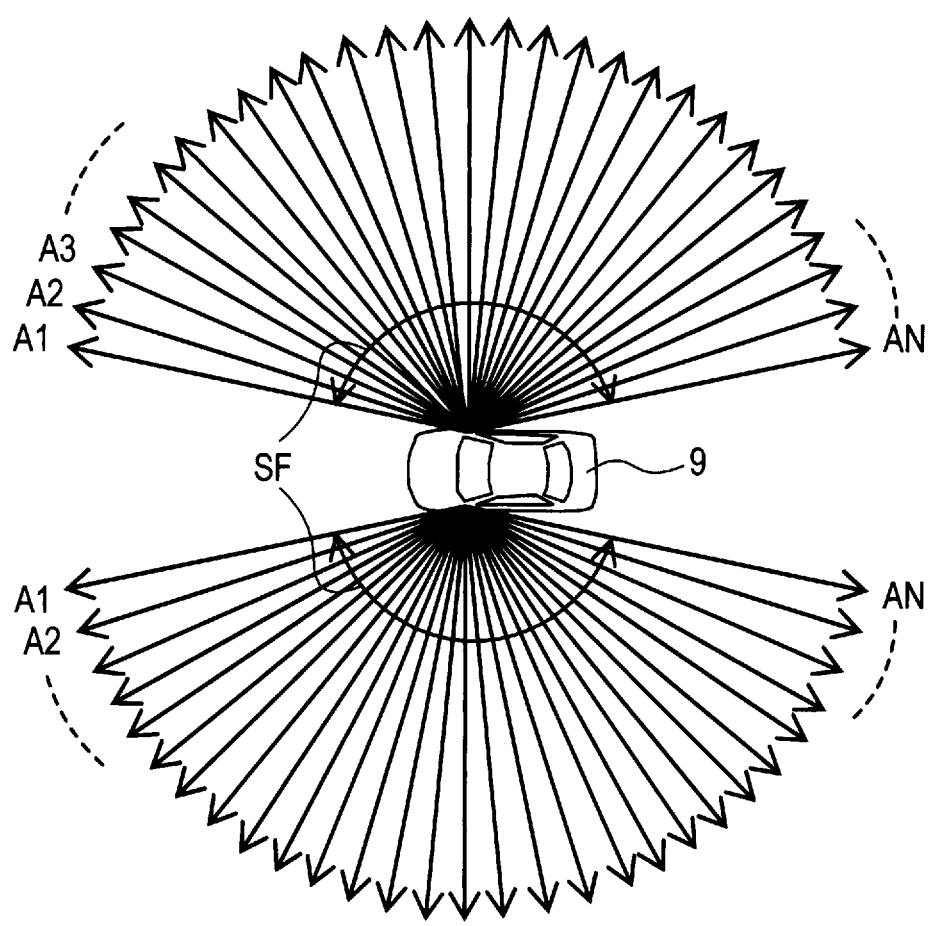
FIG. 5 is a plan view schematically illustrating a search range and divided areas of the search range according to the present embodiment.

The collimating lens 21 adjusts the search range, i.e. search field, SF of the laser light emitted from the light-emitting element 19. As shown in FIG. 5, the search range SF of each of the laser radars 3 horizontally expands to have a substantially sector or a substantially semi-circular shape, thus substantially covering a range of the surroundings of the host vehicle 9 other than regions at the front and at the rear of the host vehicle 9. The above configuration enables the light-emitting unit 11 to emit pulsed laser light in the search range SF in accordance with the light-emission control signal SC.

Figure 4:
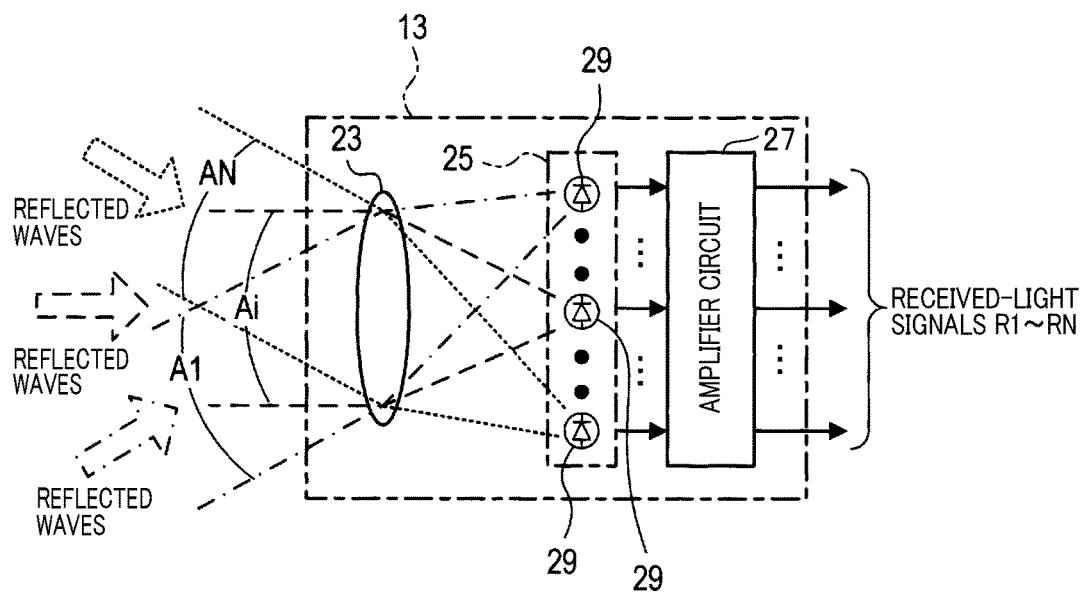
FIG. 4 is an explanatory diagram schematically illustrating an example of the structure of a light-receiving unit of the laser radar.

As shown in FIG. 4, the light-receiving unit 13 includes a condenser lens 23, a light-receiving circuit 25, and an amplifier circuit 27.

The condenser lens 23 collects reflected light which arrives from the search range SF.

The light-receiving circuit 25 is mainly composed of a plurality of light-receiving elements 29. Each of the light-receiving elements 29 generates a received-light signal having a voltage value corresponding to the intensity of the reflected light received via the condenser lens 23. The number N of light-receiving elements 29 (where N is a natural number) is equal to the number of regions in a set of divided regions A1 to AN, described hereinafter. Each of the N light-receiving elements 29 outputs a corresponding one of the received-light signals R1 to RN.

The N light-receiving elements 29 are arrayed in line along the width direction of the host vehicle 9. Each of the N light-receiving elements 29 receives only a reflected wave signal, a reflected echo, arriving from an arbitrarily selected one of the divided regions A1 to AN. The divided regions A1 to AN are formed by dividing the search range SF into N regions. The received-light signal generated by the reflected wave signal arriving from a divided region Ai is hereinafter referred to as Ri, where i is an arbitrary natural number in the range 1 to N.

The reflected wave signal is based on laser light reflected from an object. In the following description, the designation "distance measurement point" is applied to a point, on an object, from which the laser beam is reflected by the object. The reflected wave signal from a distance measurement point arrives at the light-receiving unit 13 from the direction of the distance measurement point.

As a result, the following correspondence relationship exist between the direction of a distance measurement point with respect to the light-receiving unit 13, the direction of arrival of a reflected wave signal from that distance measurement point, and the one of the received-light signals R1 to RN which is thereby produced: If the direction of the distance measurement point with reference to the light-receiving unit 13 is within a divided area Ai, a reflected wave signal arrives at the light-receiving unit 13 from that divided area Ai, and a light-receiving signal Ri is generated, where i is an arbitrary natural number in the range 1 to N.

With the above configuration, the light-receiving unit 13 receives a reflected wave signal from a distance measurement point whose direction corresponds to one of the divided areas A1 to AN, and converts the reflected wave signal into a corresponding one of the received-light signals R1 to RN in accordance with the received light intensity.

That is, the light-receiving unit 13 obtains one of the received-light signals R1 to RN in accordance with the direction of the corresponding distance measurement point with reference to the light-receiving unit 13.

The distance measurement unit 15 supplies the light-emission control signal SC to the light-emitting unit 11 at each of predetermined detection periods. The distance measurement unit 15 also measures the strengths of the light-receiving signals R1 to RN supplied from the light-receiving unit 13. Based on the emission timing of the laser light specified from the light-emission control signal SC and the light-reception timings of the reflected waves as specified from the corresponding light-receiving signals R1 to RN, the distance measurement unit 15 measures, for each of the light-receiving signals R1 to RN, the time required for the laser light to travel to a corresponding distance measurement point and return to the laser radar 3.

The distance measurement unit 15 serves as a distance calculation unit 15a1 to calculate the distance from the laser radar 3 to each distance measurement point (hereinafter referred to as the measurement point distance), using the time taken for the laser light to travel to the corresponding distance measurement point and return to the laser radar 3.

The distance measurement unit 15 also serves as a direction estimation unit 150 to estimate the direction of the distance measurement point with respect to the laser radar 3 (hereinafter referred to as the measurement point direction), based on the one of the received-light signals R1 to RN that corresponds to the distance measurement point. The distance measurement unit 15 outputs data (hereinafter referred to as distance measurement data), including the measurement point distances and measurement point directions, to the control unit 5.

Note that, as described above, the distance measurement unit 15 measures, for each of the light-receiving signals R1 to RN, the time required for the laser light to travel to a corresponding distance measurement point and return to the laser radar 3 based on the light-reception timings of the reflected waves. The distance measurement unit 15 can specify each of the light-reflection timings of the reflected waves based on, for example, change a corresponding one of the light-receiving signals R1 to RN.

For this reason, the distance measurement unit 15 cannot specify at least one light-reception timing corresponding to at least one of the light-receiving-signals R1 to RN because there is little change in the corresponding at least one of the light-receiving-signals R1 to RN due to, for example, high-illuminance optical interference around the corresponding measurement point.

For this reason, if there is no high-illuminance optical interference around each measurement point, the distance measurement data includes, for each of the light-receiving signals R1 to RN, the measurement point distance and measurement point direction of the corresponding one of the measurement points specified by the distance measurement unit 15.

However, if there is high-illuminance optical interference around at least one measurement point, the distance measurement unit 15 cannot specify the light-reception timing corresponding to the at least one measurement point, i.e. cannot specify the at least one measurement point. This results in the distance measurement data including no measurement point distance and measurement point direction for at least one of the light-receiving signals R1 to RN corresponding to the at least one unspecified measurement point.

(3) Configuration of Control Unit 5

The control unit 5 is configured mainly of a known type of microcomputer having a CPU 31 and a semiconductor memory (hereinafter referred to as a memory 33) such as a RAM, ROM, flash memory, etc. For example, the memory 33 includes a non-transitory storage medium.

Programs stored in the memory 33, such as its non-transitory storage medium, enables or causes the CPU 31 to perform various functions of the control unit 5. In other words, the CPU 31 runs the programs stored in the memory 33 to perform the various functions in accordance with instructions of the programs.

In addition, executing at least one of the programs enables a method corresponding to the at least one of the programs to be executed. The control unit 5 may be configured of one or a plurality of microcomputers.

Figure 6:
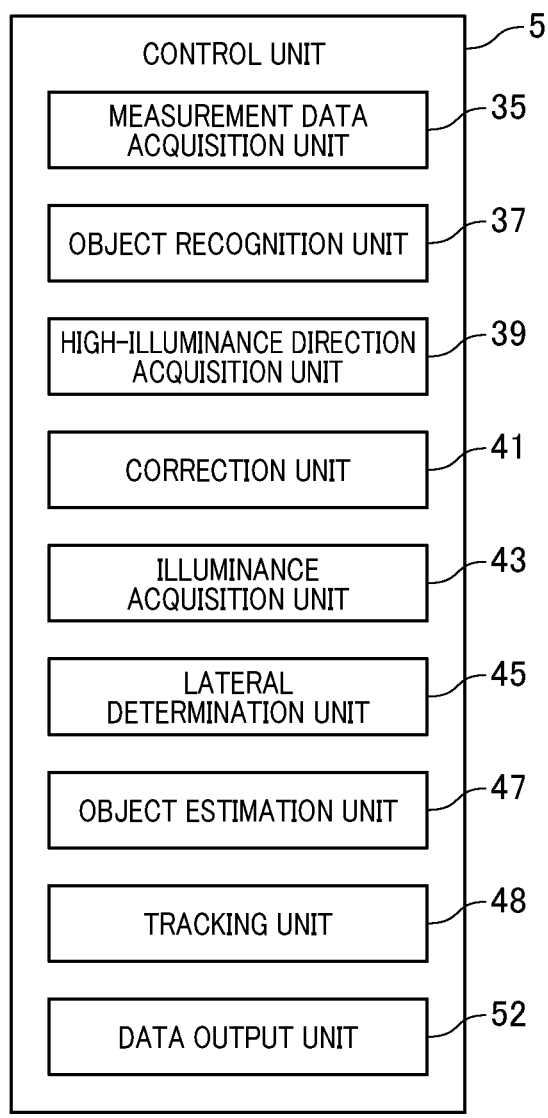
FIG. 6 is a block diagram schematically illustrating an example of the functional configuration of a control unit illustrated in FIG. 1.

As shown in FIG. 6, the control unit 5 functionally includes a distance measurement data acquisition unit 35, an object recognition unit 37, a high-illuminance direction acquisition unit 39, a correction unit 41, an illuminance acquisition unit 43, a lateral determination unit 45, an object estimation unit 47, a tracking unit 48, and a data output unit 52. As described above, the CPU 31 runs one or more the programs to implement these functional modules 35, 37, 39, 41, 43, 45, 47, 48, and 52, which are operatively linked to each other.

The present embodiment implements the functional modules based on software, i.e. the programs, but can implement all or part of the functional modules based on a hardware structure comprised of logic circuits, analog circuits, or other hardware modules combined with each other.

Detailed descriptions of the functional modules 35, 37, 39, 41, 43, 45, 47, 48, and 52 will be described later.

Additionally, the control unit 5 is capable of communicating with a driving support unit 51 by an in-vehicle controller area network (CAN) 49, which is a registered trademark.

(4) Configuration of Illuminance Sensor 7

As shown in FIG. 2, the illuminance sensors 7 is located in the passenger compartment of the host vehicle 9 to be close to the windshield 53. The illuminance sensor 7 detects ambient illuminance of the host vehicle 9 and sends the detection results to the control unit 5.

2. Object Recognition Routine

The following describes an object recognition routine for each laser radar 3, which is repetitively carried out by the object recognition apparatus 1 at predetermined time intervals with reference to FIGS. 7 to 14.

In particular, the object recognition routine is executed by the control unit 5.

Figure 7:
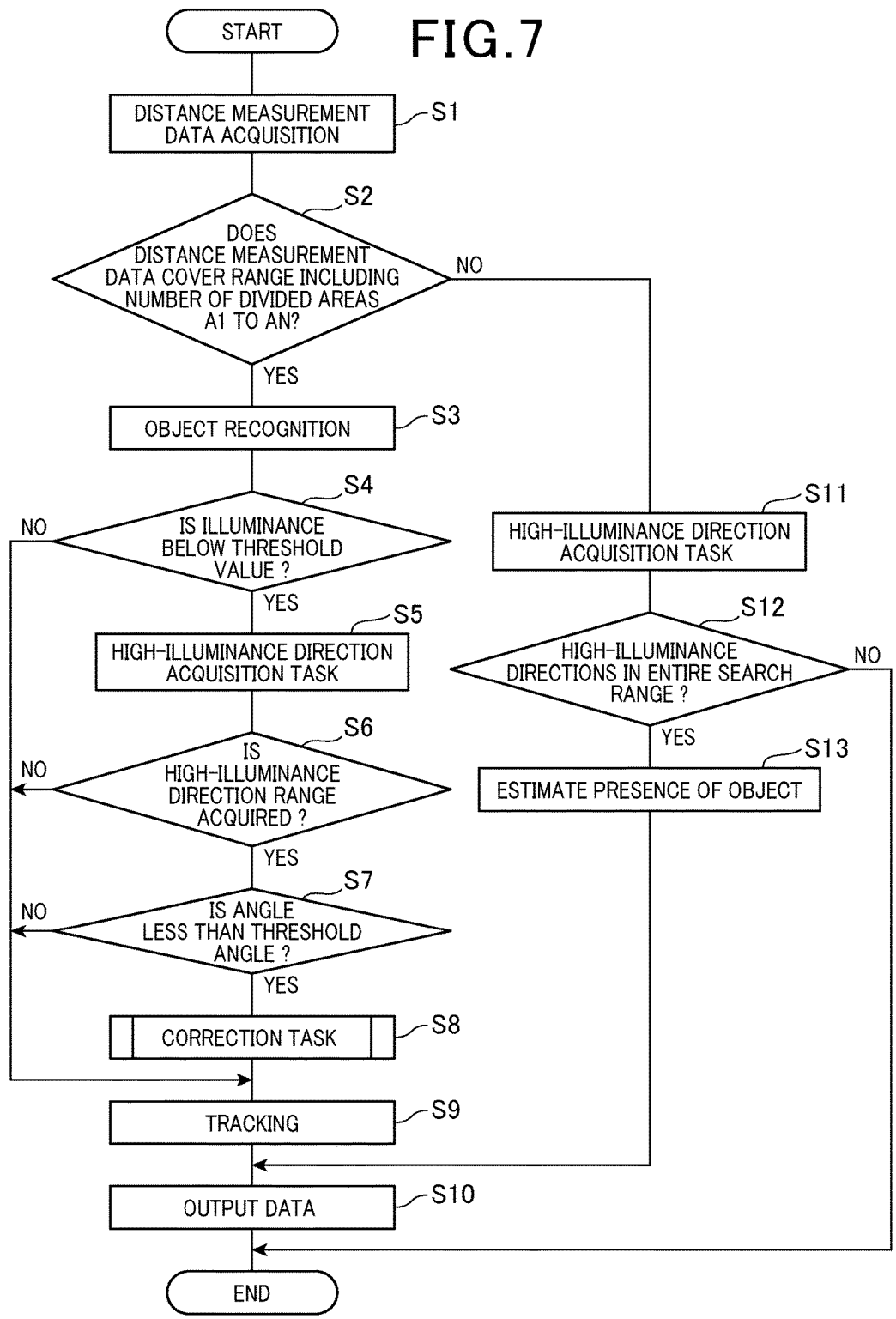
FIG. 7 is a flowchart schematically illustrating an object recognition routine executed by the object recognition apparatus.

In step 1 (S1) of the current cycle of the object recognition routine illustrated in FIG. 7, the distance measurement data acquisition unit 35 acquires distance measurement data, which includes the measurement point distances and measurement point directions, from each of the laser radars 3. For example, the distance measurement data acquisition unit 35 receives distance measurement data from the laser radar 3 repetitively sent from the laser radar 3, or repetitively causes each of the laser radars 3 to obtain distance measurement data and to send the distance measurement data to the control unit 5.

In step 2, the distance measurement data acquisition unit 35 determines whether the distance measurement data acquired in step 1 covers a predetermined range including a predetermined number of the divided areas A1 to AN.

Upon it being determined that the distance measurement data acquired in step 1 covers the predetermined range including the predetermined number of the divided areas A1 to AN (YES in step 2), the object recognition routine proceeds to step 3.

Otherwise upon determining that the distance measurement data acquired in step 1 does not cover the predetermined range including the predetermined number of the divided areas A1 to AN (NO in step 2), the object recognition routine proceeds to step 11.

That is, as described above, if there is high-illuminance optical interference around at least one measurement point, the distance measurement unit 15 cannot specify at least one light-reception timing corresponding to the at least one measurement point, i.e. cannot specify the at least one measurement point. This results in the distance measurement data including no measurement point distance and measurement point direction for at least one of the light-receiving signals R1 to RN corresponding to the at least one measurement point.

In step 3, the object recognition unit 37 performs a recognition task to recognize an object, which includes the distance measurement points, using the distance measurement points, i.e. their measurement point distances and measurement point directions, contained in the distance measurement data obtained in step 1. For example, the object recognition unit 37 performs, as the recognition task, a task of (1) Generating at least one cluster including distance measurement points having mutual distances that are less than a threshold value (2) Recognizing the at least one cluster as an object, i.e. recognizing, for example, a horizontally rectangular region as the object.

That is, the region recognized as the object by the recognition task has a predetermined shape similar to the horizontally actual shape of the object. For example, the region recognized as the object by the recognition task has a horizontally rectangular-like shape having a length in the direction parallel to the travelling direction of the host vehicle 9, a width perpendicular to the length direction, and a pair of edges, i.e. lateral edges, which are opposite to each other in the longitudinal direction.

Figure 8:
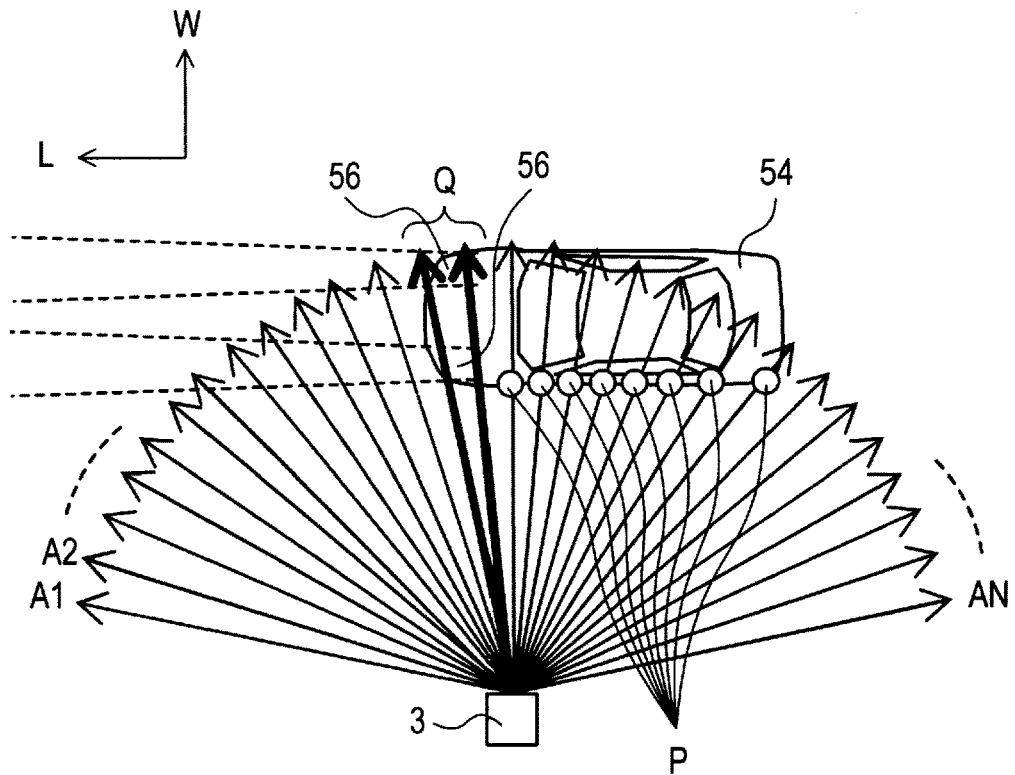
FIG. 8 is an explanatory diagram schematically illustrating an example of distance measurement points and an example of a high-illuminance direction range according to the present embodiment.
Figure 9:
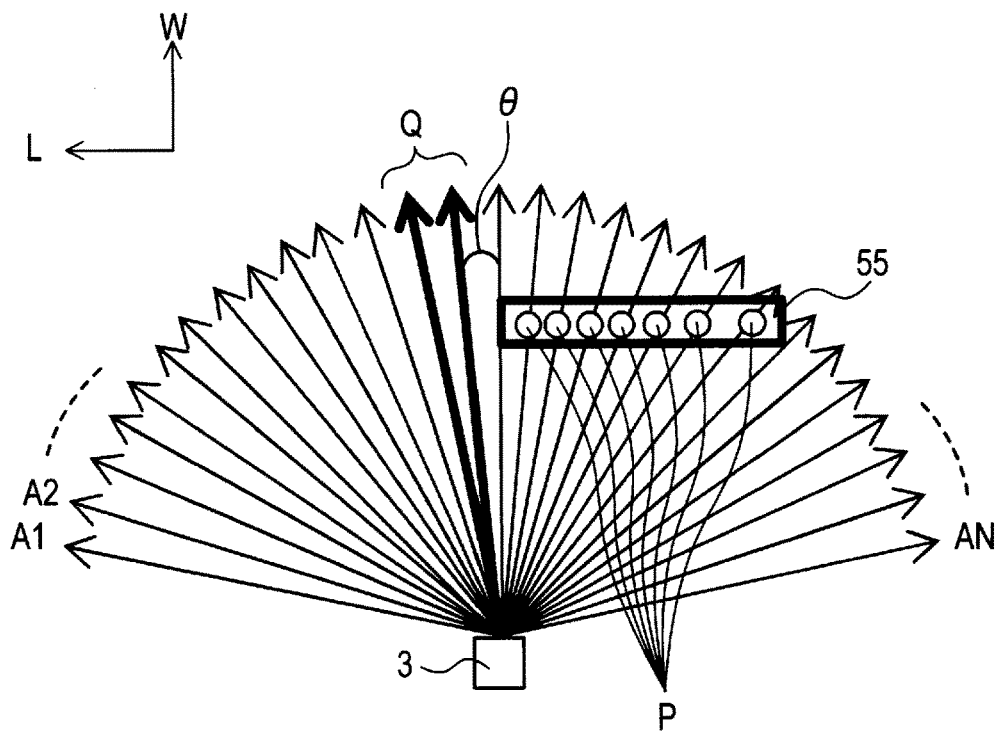
FIG. 9 is an explanatory diagram schematically illustrating an example of a positional relationship between a recognized object region based on the distance measurement points and the high-illuminance direction range illustrated in FIG. 8.

FIGS. 8 and 9 schematically illustrate an example of how the recognition task is carried out.

As shown in FIG. 8, it is assumed that there are a plurality of distance measurement points P having mutual distances that are less than the threshold value. In this assumption, as shown in FIG. 9, the recognition task combines the plurality of distance measurement points P into a cluster, and recognizes the cluster as an object 55, i.e. a horizontally rectangular object region 55, based on the distance measurement points P. The example of FIGS. 8 and 9 shows that the plurality of distance measurement points P are on the surface of a target vehicle 54 recognized as the object region 55.

Note that, in FIG. 8 and some other figures, L direction represents the travelling direction of the host vehicle 9, and W direction represents the direction which is along the width direction of the host vehicle 9 and is directed away from the host vehicle 9.

Returning to FIG. 7, in step 4, the illuminance acquisition unit 43 acquires the ambient illuminance around the host vehicle 9 using the illuminance sensor 7. Next, the illuminance acquisition unit 43 determines whether the acquired ambient illuminance is equal to or less than a predetermined threshold value. When the ambient illuminance is determined to be equal to or less than the threshold value, the object recognition routine proceeds to step 5. Otherwise, when the ambient illuminance is determined to exceed the threshold value, the object recognition routine proceeds to step 9.

In step 5, the high-illuminance direction acquisition unit 39 acquires the light-receiving signals R1 to RN from the laser radar 3 while the light-emitting element 19 is not being activated. The state in which the light-emitting element 19 is not being driven or activated corresponds to a state in which the light-receiving unit 13 does not receive reflected waves of laser light.

In step 5, the high-illuminance direction acquisition unit 39 determines whether there are one or more signals among the received-light signals R1 to RN; the one or more signals each have a signal intensity exceeding a predetermined threshold value.

In step 5, upon determining that there are one or more signals, the high-illuminance direction acquisition unit 39 selects the one or more signals from the received-light signals R1 to RN as one or more high-illuminance signals.

The high-illuminance direction acquisition unit 39 identifies the directions of one or more regions in the divided regions A1 to AN as a high-illuminance direction range Q; the one or more regions respectively correspond to the selected one or more signals. That is, the high-illuminance direction range Q is comprised of the directions of one or more regions in the divided regions A1 to AN. For example, the high-illuminance direction acquisition unit 39 identifies the total region based on one or more regions respectively corresponding to the selected one or more high-illuminance signals as a high-illuminance direction range Q.

FIGS. 8 and 9 show an example of such a high-illuminance direction range Q.

FIGS. 8 and 9 illustrate an example where the high-illuminance direction range Q is a direction range in which headlights 56 of the target vehicle 54 are located.

In step 6, the correction unit 41 determines whether a high-illuminance direction range Q has been acquired in step 5.

When it is determined that a high-illuminance direction range Q has been acquired (YES in step 6), the object recognition routine proceeds to step 7. Otherwise, when it is determined that no high-illuminance direction ranges Q have been acquired in step 5 (NO in step 5), the object recognition routine proceeds to step 9.

In step 7, the correction unit 41 determines whether the angle θ between a closer edge direction of the object region recognized in step 3 and the high-illuminance direction range Q acquired in step 5 is smaller than a predetermined threshold angle. The condition in which the angle θ is smaller than the predetermined threshold angle represents, for example, the fact that the closer edge direction of the object region recognized in step 3 and the high-illuminance direction range Q have a predetermined positional relationship. The object or the object region recognized in step 3 will also be referred to simply as a recognized object or recognized object region. The recognized object region corresponds to, for example, recognition region of the object.

The closer edge direction of the object region recognized in step 3 means the direction of an edge of the recognized object region, which is closer to the high-illuminance direction range Q, with reference to the laser radar 3.

If the object region recognized in step 3 has a length along the expanding direction of the search region SF, there are a plurality of distance measuring points P along the search region SF (see FIG. 8). In this case, one of the distance measuring points P, which is the closest to the high-illuminance direction range Q, corresponds to the closer edge of the recognized object region; the closer edge direction of the recognized object region represents the direction of a closer edge of the recognized object region 55 with respect to the laser radar 3 in FIG. 8, which is closer to the high-illuminance direction range Q than the other opposing edge of the recognized object region 55.

In this case, the angle θ is defined as the angle between the high-illuminance direction range Q and the closer edge direction of the recognized object region, which is closer to the high-illuminance direction range Q.

If the high-illuminance direction range Q is comprised of plural regions in the divided regions A1 to AN, the high-illuminance direction range Q has a length along the search region SF (see FIG. 8). In this case, the high-illuminance direction range Q has an edge that is the closest to the recognized object region (see recognized object region 55 in FIG. 8). In this case, the angle θ is defined as the angle between the closest edge of the high-illuminance direction range Q and the closer edge direction of the recognized object region.

When it is determined that the angle θ is smaller than the predetermined threshold angle (YES in step 8), the object recognition routine proceeds to step 8. Otherwise, when it is determined that the angle θ is equal to or larger than the predetermined threshold angle (YES in step 8), the object recognition routine proceeds to step 9.

In step 8, a correction module comprised of the correction unit 41 and lateral determination unit 45 performs a correction task to correct the range of the object region recognized in step 3.

Figure 10:
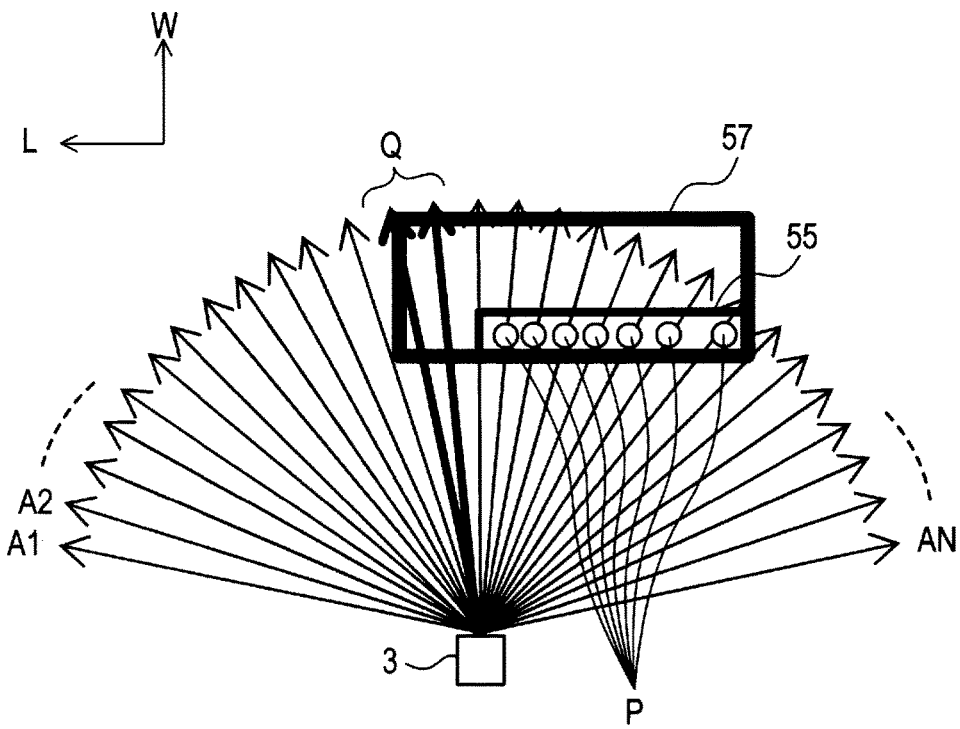
FIG. 10 is an explanatory diagram schematically illustrating how the recognized object region is corrected according to the present embodiment.

As shown in FIG. 10, the correction task is configured to correct, i.e. enlarge, the recognized object region 55 such that a corrected, i.e. enlarged, region of an object 57 includes, i.e. encloses, the high-illuminance direction range Q, as viewed from the laser radar 3. Since the laser radar 3 is mounted on the host vehicle 9, the fact that the corrected object, i.e. corrected object region, 57 includes the high-illuminance direction range Q as viewed from the laser radar 3 corresponds to the fact that the corrected object region 57 includes the high-illuminance direction range Q as viewed from the host vehicle 9.

Note that the corrected (enlarged) object region includes, i.e. encloses, the high-illuminance direction range Q as viewed from the laser radar 3 means that the high-illuminance direction range Q passes through the corrected object region, i.e. overlaps with the corrected object region, as viewed from the vertical direction of the host vehicle 9 (see the corrected object region 57 in FIG. 10).

Figure 12:
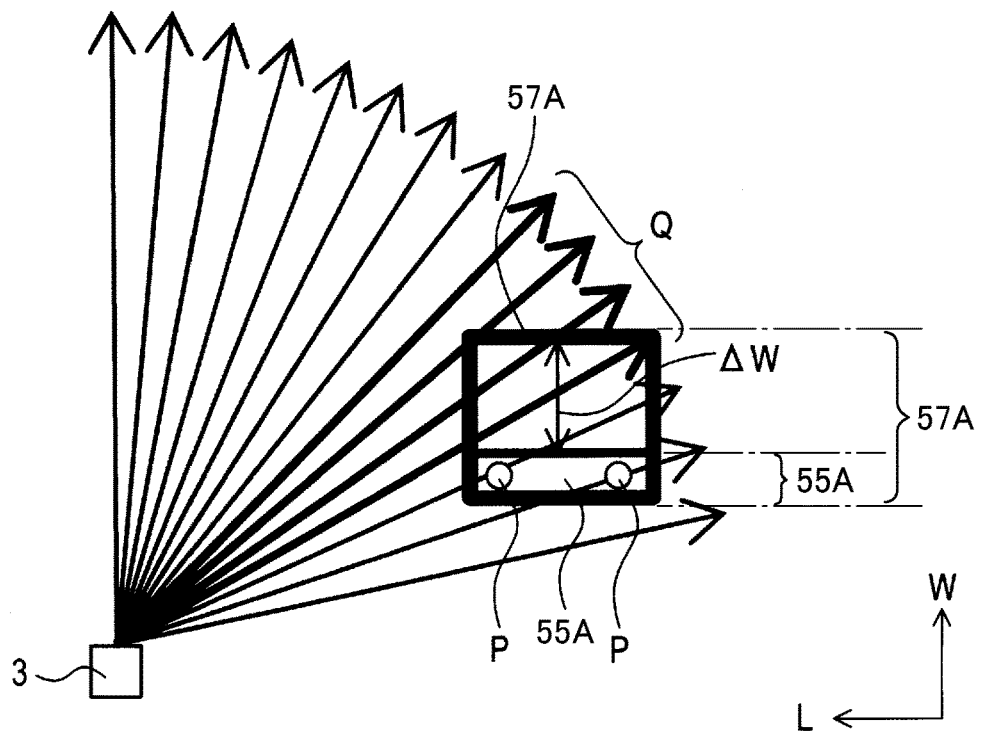
FIG. 12 is an explanatory diagram schematically illustrating an example of how a recognized object region is enlarged by a predetermined amount in a width direction of the host vehicle.
Figure 13:
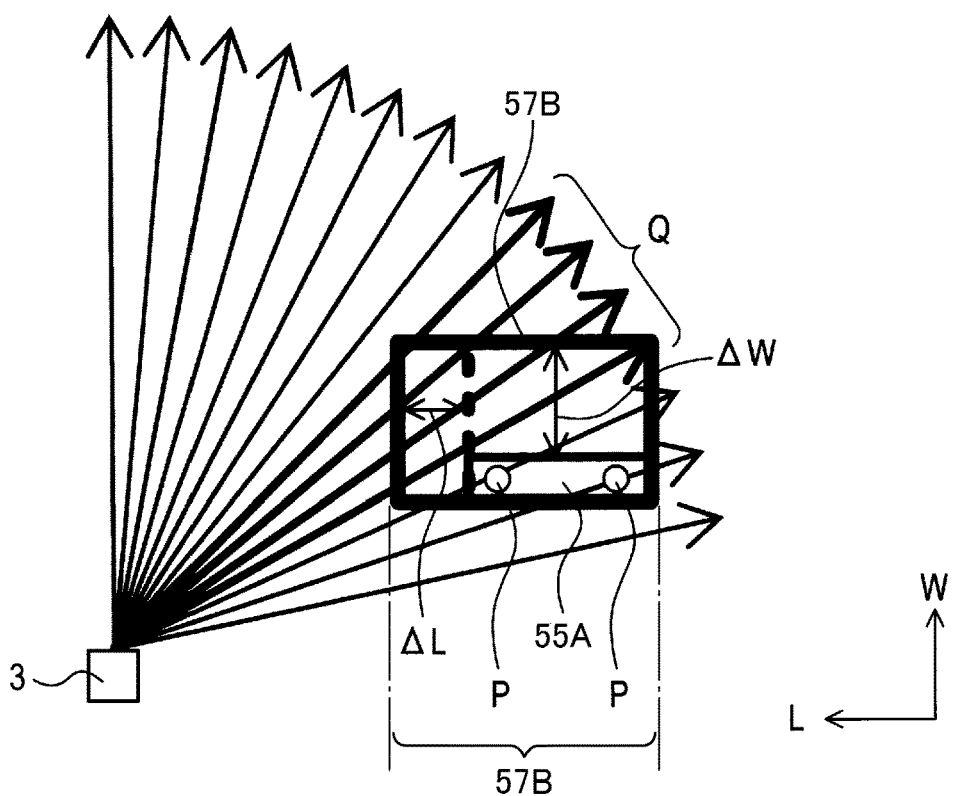
FIG. 13 is an explanatory diagram schematically illustrating an example of how the recognized object region, which has been enlarged in the width direction of the host vehicle, is further enlarged by a predetermined amount in a travel direction of the host vehicle.

The above correction task in step 8 will be described as a subroutine in more detail with reference to FIGS. 11 to 13.

Figure 11:
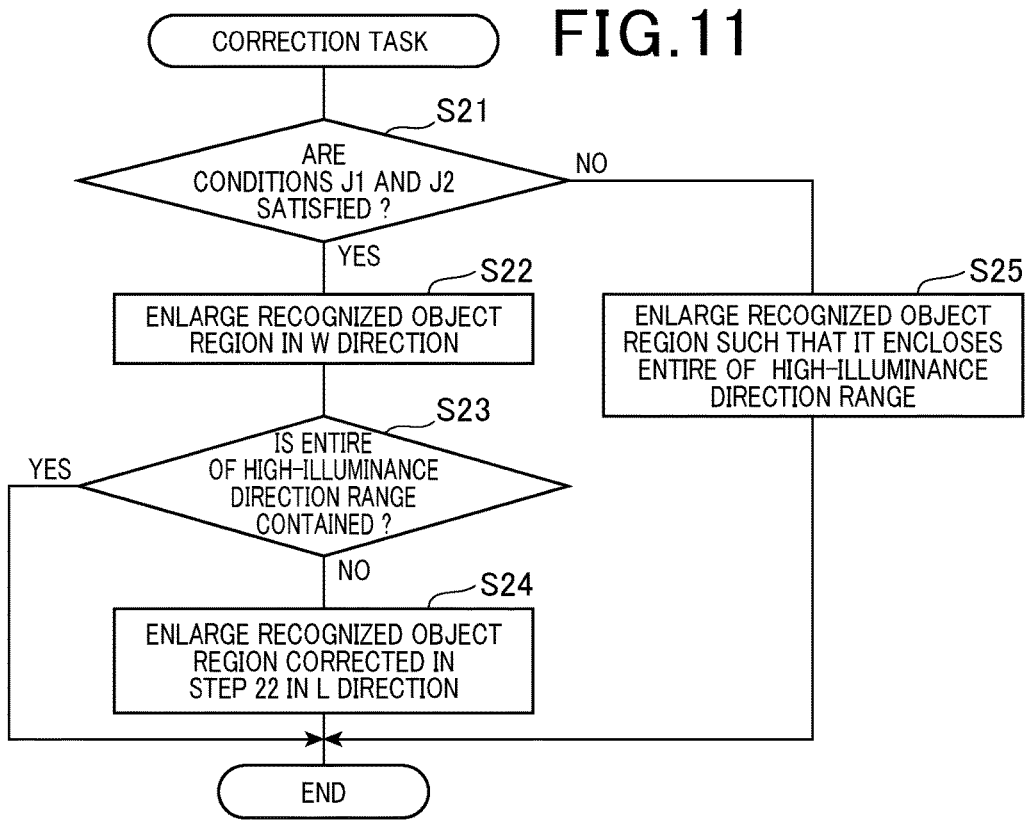
FIG. 11 is a flowchart schematically illustrating a subroutine indicative of the correction task in step 8 of the object recognition routine.

In step 21 of FIG. 11, the lateral determination unit 45 determines whether the object region recognized in step 3 and the high-illuminance direction range Q acquired in step 5 respectively satisfy the following conditions J1 and J2:

J1. The object region recognized in step 3 is positioned laterally with respect to the host vehicle 9

J2. The high-illuminance direction range Q acquired in the step 5 is farther than the object region recognized in step 3, along the travel direction L of the host vehicle 9

Note that positions that are in a lateral direction with respect to the host vehicle 9 include not only positions that are directly lateral with respect to one side of the host vehicle 9 but also positions that are obliquely rearward and positions that are diagonally forward with respect to one side of the host vehicle 9.

The subroutine proceeds to step 22 when it is determined that both of the conditions J1 and J2 are satisfied (YES in step 21). Otherwise, the subroutine proceeds to step 25 when it is determined that at least one of the conditions J1 and J2 are not satisfied (NO in step 21).

In step 22, the correction unit 41 enlarges the object region recognized in step 3 in the W direction described above. For example, as illustrated in FIG. 12, the correction unit 41 expands an object region 55A recognized in step 3 in the W direction, i.e. the direction is along the width direction of the host vehicle 9 and is directed away from the host vehicle 9. Enlargement in the W direction corresponds to correction of the object region 55 or 55A recognized in step 3. The corrected object, i.e. the corrected object region in FIG. 12 is illustrated by reference numeral 57A.

The enlargement amount ΔW in the W direction is the smaller one of (1) The minimum enlargement amount necessary to ensure that the entire of the high-illuminance direction range Q is included in the corrected object region (see reference numeral 57 in FIG. 10 or 57A in FIG. 12), as viewed from the laser radar 3

(2) The enlargement amount whereby the width of the corrected object region 57 or 57A is expanded in the W direction is 2.5 m.

Note that 2.5 m is the maximum width for a general type of vehicles, which is permitted by Japanese Road Transport Vehicle Act. 2.5 m corresponds to, for example, a predetermined first upper limit value. Another value for a general type of vehicles, which is permitted by road trucking vehicle law or other similar regulations in one of the corresponding countries that the present application are going to be filed, can be used as the predetermined first upper limit value.

In step 23, the correction unit 41 determines whether the entire of the high-illuminance direction range is included in the corrected object region 57 or 57A as seen from the laser radar 3, as a result of the correction in step 22.

Upon determining that the entire of the high-illuminance direction range Q is included in the corrected object region 57 or 57A, the correction unit 41 terminates the object recognition routine. Otherwise, upon it being determined that part of the high-illuminance direction range Q is not included in the corrected object region 57 or 57A, the subroutine proceeds to step 24.

In step 24, the correction unit 41 further corrects the object region 57A corrected in step 22 to enlarge the corrected object region 57A in the L direction described above. For example, as illustrated in FIG. 13, the correction unit 41 expands the corrected object region 57A in the L direction, i.e. the travelling direction of the host vehicle 9. The further corrected object region in FIG. 13 is illustrated by reference numeral 57B.

The enlargement amount ΔL in the L direction is the smaller one of (1) The minimum enlargement amount necessary to ensure that the entire of the high-illuminance direction range Q is included in the further corrected object region (see reference numeral 57B in FIG. 13), as viewed from the laser radar 3

(2) The enlargement amount whereby the longitudinal length of the further corrected object region 57B in the L direction is 12 m.

Note that 12 m is the maximum longitudinal length for a general type of vehicles, which is permitted by Japanese Road Transport Act. 12 m corresponds to, for example, a predetermined second upper limit value. Another value for a general type of vehicles, which is permitted by road trucking vehicle law or other similar regulations in one of the corresponding countries that the present application are going to be filed, can be used as the predetermined second upper limit value.

When the enlarging operation in step 24 has been completed, the correction unit 41 terminates the subroutine, i.e. correction task in step 8, so that the object recognition routine proceeds to step 9.

As described above, the subroutine proceeds to step 25 when it is determined that at least one of the conditions J1 and J2 are not satisfied (NO in step 21).

In step 25, the correction unit 41 enlarges the object region recognized in step 3 toward the side of the high-illuminance direction range Q such that the enlarged object region includes the entire of the high-illuminance direction range Q as viewed from the laser radar 3. When the enlarging operation in step 25 has been completed, the correction unit 41 terminates the subroutine, i.e. correction task in step 8, so that the subroutine proceeds to step 9.

In step 3, the object recognition unit 37 can recognize plural object regions each including corresponding distance measurement points having mutual distances that are less than the threshold value in step 3. In this case, the control unit 5 performs the operations in steps 5 to 7 for each of the recognized plural object regions, thus determining whether the angle θ between the closer edge direction of each of the plural object regions recognized in step 3 and the high-illuminance direction range Q acquired for the corresponding one of the plural object regions in step 5 is smaller than the predetermined threshold angle.

At that time, upon determining that the angle θ between the closer edge direction of each of the plural object regions recognized in step 3 and the high-illuminance direction range Q acquired for the corresponding one of the plural object regions in step 5 is smaller than the predetermined threshold angle, the correction unit 41 is configured to select one of the plural object regions as the correction target in step 8 as follows.

Figure 14A:
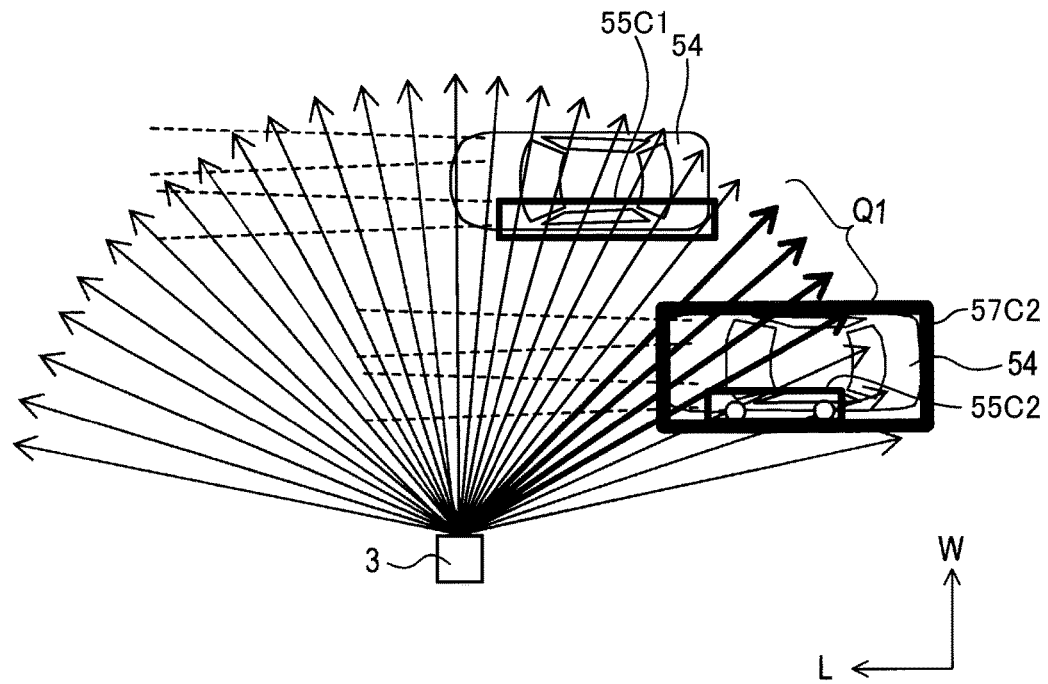
FIG. 14A is an explanatory diagram schematically illustrating a positional relationship between a first recognized object region, a second recognized object region, and a high-illuminance direction range.

For example, as illustrated in FIG. 14A, it is determined that (1) The angle θ1 between the closer edge direction of a first object region 55C1 recognized in step 3 and a high-illuminance direction range Q1 acquired in step 5 is smaller than the predetermined threshold angle (2) The angle θ2 between the closer edge direction of a second object region 55C2 recognized in step 3 and the same high-illuminance direction range Q1 is smaller than the predetermined threshold angle (3) The first object region 55C1 is more advanced than the high-illuminance direction range Q1 in the travelling direction of the host vehicle 9, and the second object region 55C2 is less advanced than the high-illuminance direction range Q1 in the travelling direction of the host vehicle 9.

In this case illustrated in FIG. 14A, the correction unit 41 is configured to (1) Select the second object region 55C2 as the correction target in step 8, because the second object region 55C2 is less advanced than the high-illuminance direction range Q1 in the travelling direction of the host vehicle 9

(2) Correct, i.e. enlarge, the selected second object region 55C2 such that an enlarged second object region 57C2 encloses the high-illuminance direction range Q1 without correcting the first object region 55C1.

This is because, for example, there is a higher probability that the first high-illuminance direction range Q1 is based on the headlights of the second object region 57C2.

Additionally, the correction unit 41 is configured to (1) Determine whether there is an additional high-illuminance direction range Q2, which is more advanced than the first object region 55C1 in the travelling direction of the host vehicle 9

Figure 14B:
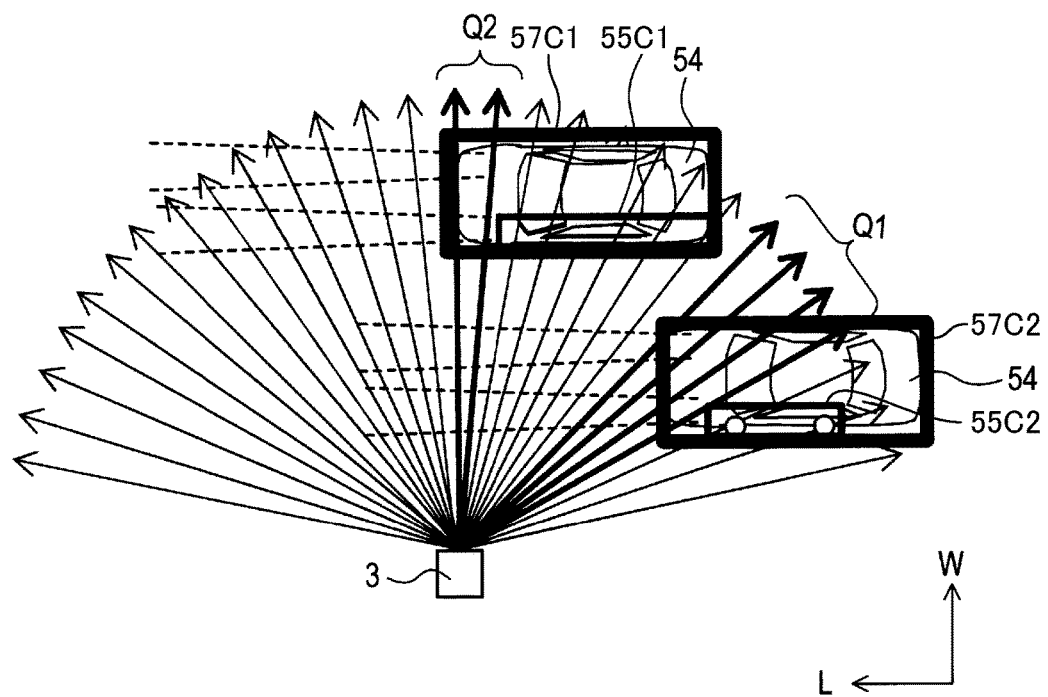
FIG. 14B is an explanatory diagram schematically illustrating a positional relationship between the first recognized object region and an additional high-illuminance direction range.

(2) Correct, i.e. enlarge, the first object region 55C1 such that an enlarged second object region 57C1 encloses the high-illuminance direction range Q2 upon determining that there is the additional high-illuminance direction range Q2, which is more advanced than the first object region 55C1 in the travelling direction of the host vehicle 9 (see FIG. 14B).

This is because, for example, it is likely that the high-illuminance direction range Q2 is based on the headlights of the first object region 57C1.

When the enlarging operation in step 24 or step 25 has been completed, the object recognition routine terminates the subroutine, and proceeds to step 9.

In step 9, the tracking unit 48 performs a process of associating, i.e. linking, the recognized object region in step 3 or the corrected object region in step 8 of the current cycle of the object recognition routine to past recognized or corrected object region in a past cycle of the object recognition routine, such as an immediately previous cycle of the object recognition routine. The linking process will be referred to as a tracking process.

When the tracking process in step 9 is completed, the object recognition routine proceeds to step 10.

On the other hand, upon it being determined that the distance measurement data acquired in step 1 does not cover the predetermined range including the predetermined number of the divided areas A1 to AN (NO in step 2), the object recognition routine proceeds to step 11.

In step 11, the high-illuminance direction acquisition unit 39 obtains a high-illuminance direction range Q in the same approach as the operation in step 5.

Then, in step 12, the high-illuminance direction acquisition unit 39 determines whether the entire search range SF matches with the high-illuminance direction range Q acquired in step 11. In other words, the high-illuminance direction acquisition unit 39 determines whether the distance measurement data acquired in step 1 includes no distance measurement points.

Upon it being determined that the entire search range SF substantially matches with the high-illuminance direction range Q acquired in step 11, i.e. the distance measurement data acquired in step 1 includes no distance measurement points (YES in step 12), the object recognition routine proceeds to step 13. Otherwise, upon it being determined that the entire search range SF does not match with the high-illuminance direction range Q acquired in step 11 (NO in step 12), the control unit 5 terminates the object recognition routine.

In step 13, the object estimation unit 47 estimates that an object, i.e. an object region, exists in at least part of the high-illuminance direction range Q, i.e. the search ranges SF, and thereafter, the object recognition routine proceeds to step 10.

Following the operation in step 9 or step 10, the data output unit 52 outputs data to the driving support unit 51; the data to be output to the driving support unit 51 include the following contents:

(i) The position and size of the object 55 recognized in step 3 if no correction to the recognized object 55 in step 8 is carried out (ii) The position and size of the corrected object 57 in step 8 if the correction in step 8 has been carried out to the recognized object 55

(iii) The result of the tracking process performed in step 9 described above (iv) The estimation result in step 13 when it is estimated that the object exists in part of the searching region SF.

When receiving the data output from the data output unit 52 of the control unit 5, the driving support unit 51 is capable of performing various types of driving support tasks using the received data.

For example the driving support unit 51 is capable of performing at least one of (1) Steering the host vehicle 9 to avoid a collision or an approach of the host vehicle 9 to the recognized object 55 or the corrected object 57

(2) Controlling the speed of the host vehicle 9, such as controlling acceleration or deceleration of the host vehicle 9, to keep at least predetermined distance between the host vehicle 9 and the recognized object 55 or the corrected object 57.

3. Advantageous Effect of Object Recognition Apparatus 1

If there is high-illuminance optical interference, such as high-illuminance interference light, for example, light from vehicle headlights, around at least one measurement point, the laser radar 3 cannot obtain at least one measurement point from an object to be recognized. This may result in the size of the object recognized by the conventional object recognition apparatus disclosed in BACKGROUND of the present specification being smaller than the actual size of the object.

In contrast, the object recognition apparatus 1 is configured to correct the recognized region of the object 55 such that the corrected region of the object 55 encloses at least a part of a high-illuminance direction range Q, as viewed from the host vehicle 9, on the following conditions that a predetermined positional relationship is established between the high-illuminance direction range Q and the recognized region of the object 55. This configuration prevents the size of the recognized object from being smaller than the actual size of the object. That is, the object recognition apparatus 1 recognizes objects with higher accuracy while reducing the adverse effects of high-illuminance optical interference, such as high-illuminance interference light.

The conditions for the object recognition apparatus 1 to correct the recognized region of the object 55 include, for example, that the angle θ between the closer edge direction of the recognized object region 55 and the high-illuminance direction range Q is smaller than the predetermined threshold angle.

This enables the object recognition apparatus 1

(1) To correct the recognized object region when there is a high possibility that an actual object to be recognized is at least partly located in the high-illuminance direction range Q (2) Not to correct the recognized object region when there is a high possibility that the actual object to be recognized is not located in the high-illuminance direction range Q.

When the ambient illuminance of the host vehicle 9 is below the threshold value, there is a high possibility that the headlights of one or more other vehicles around the host vehicle 9 are switched on.

In view of these circumstances, the conditions for the object recognition apparatus 1 to correct the recognized object region include, for example, that the ambient illuminance of the host vehicle 9 is less than the threshold value.

This enables the object recognition apparatus 1 to (1) Correct the recognized object region when there is a high possibility that the laser radar 3 cannot obtain at least one measurement point from an object to be recognized (2) Note to correct the recognized object region when there is a low possibility that the laser radar 3 cannot obtain at least one measurement point from an object to be recognized.

The object recognition apparatus 1 is configured to determine whether the recognized object region and the high-illuminance direction range Q respectively satisfy the following conditions J1 and J2:

J1. The recognized object region is positioned laterally with respect to the host vehicle 9

J2. The high-illuminance direction range Q is farther than the recognized object region along the travel direction L of the host vehicle 9

The situation where the conditions J1 and J2 are satisfied shows a specific situation where there is a high possibility that (1) There is a vehicle travelling at the lateral side of the host vehicle 9, which will be referred to as a lateral vehicle (2) The high-illuminance direction range Q is based on the headlights of the lateral vehicle.

This specific situation results in there being a high possibility that the laser radar 3 cannot obtain at least one measurement point from a part of the lateral vehicle, due to the high-illuminance directions Q of the high-illuminance interference light from the headlights of the lateral vehicle.

In order to address the situation where the conditions J1 and J2 are satisfied, the object recognition apparatus 1 is configured to (1) Determine whether the conditions J1 and J2 are satisfied (2) Correct the recognized object region when it is determined that the conditions J1 and J2 are satisfied.

Specifically, the object recognition apparatus 1 is configured to enlarge, as the correction, the recognized object region 55, which is a part of the lateral vehicle, in the W direction and the L direction. This configuration enables the object recognition apparatus 1 to recognize the lateral vehicle with higher accuracy.

The object recognition apparatus 1 is configured to enlarge the recognized object region in each of the W and L directions such that the enlarged amount of the recognized object region is equal to or smaller than a corresponding one of the first and second upper limits.

This configuration prevents enlargement of the recognized object region beyond the actual size of the object 55.

If the entire of the actual object overlaps a high-illuminance direction range Q, the object recognition apparatus 1 cannot acquire any distance measurement points from the actual object even if the actual object exists around the host vehicle 9.

In order to address such a situation, the object recognition apparatus 1 is configured to estimate that an object region exists in at least part of the high-illuminance direction range Q upon determining that the entire search range SF matches with the high-illuminance direction range Q, i.e. the distance measurement data includes no distance measurement points.

This configuration enables the existence of an object to be recognized even if there are no distance measurement points obtained from the object.

Modifications

The present disclosure is not limited to the present embodiment, and can be variably modified within the scope of the present disclosure.

The object recognition apparatus 1 can always carry out the operation in step 5 after completing the operation in step 3. That is, the object recognition apparatus 1 can carry out the operation in step 3 irrespective of the ambient illuminance around the host vehicle 9.

Following the operation in step 21, the correction unit 41 can enlarge the object region recognized in step 3 in the L direction (see step 24). Then, the correction unit 41 can enlarge the corrected object region in the W direction (see step 22) upon determining that part of the high-illuminance direction range Q is not included in the corrected object region (see step 23).

In step 12, the high-illuminance direction acquisition unit 39 can determine whether at least a predetermined threshold percentage of the search range SF matches with the high-illuminance direction range Q acquired in step 11. The high-illuminance detection acquisition unit 39 performs affirmative determination when the at least predetermined percentage of the search range SF matches with the high-illuminance direction range Q, and performs negative determination when the at least predetermined percentage of the search range SF does not match with the high-illuminance direction range Q.

The threshold percentage of the search range SF can be set to 100 percent or another suitable percentage.

In step 7, the correction unit 41 can perform one of determinations different from the determination of the present embodiment.

Specifically, the correction unit 41 can determine whether the length of a line connecting between a predetermined first point of the closer edge direction of the recognized object region and a predetermined second point, which is opposite to the first point, of one edge direction of the high-illuminance direction range Q, which is closer to the recognized object region, is shorter than a predetermined threshold length.

That is, the correction unit 41 performs the correction task in step 8 upon determining that the line is shorter than the predetermined threshold line, and does not perform the correction task in step 8 upon determining that the line is not shorter than the predetermined threshold line.

In addition, the correction unit 41 can be configured to (1) Combine the recognized object region with a part of the high-illuminance direction range Q; the part of the high-illuminance direction range Q is adjacent to the recognized object region in the direction parallel to the longitudinal direction of the host vehicle 9

(2) Determine whether the shape of the combined shape of the recognized object region and the part of the high-illuminance direction range Q is close to the shape of a predetermined portion of a predetermined object to be recognized, such as the shape of the lateral, i.e. horizontal, cross section of a vehicle.

That is, the correction unit 41 performs the correction task in step 8 upon determining that the shape of the combined shape of the recognized object region and the part of the high-illuminance direction range Q is close to the shape of the predetermined portion of the predetermined object to be recognized. The correction unit 41 also does not perform the correction task in step 8 upon determining that the shape of the combined shape of the recognized object region and the part of the high-illuminance direction range Q is not close to the shape of the predetermined portion of the predetermined object to be recognized.

The object recognition apparatus 1 can include a member for scanning the laser light emitted from the light-emitting unit 11. For example, the object recognition apparatus 1, such as the laser radar 3, can be configured to use a polygonal mirror, a plane mirror, a MEMS mirror, a light phased array or the like as the scanning member to (1) Change the direction of the laser light emitted from the light-emitting unit 11 to receive reflected light for each of the changed directions of the emitted laser light, thus obtaining received-light signals (2) Calculate, for each of the received-light signals, the distance of a corresponding distance measurement point and estimating the direction of the distance measurement point as viewed from the light-emitting unit 11, thus specifying the distance measurement points for the respective received-light signals.

The distance measurement unit 15 is configured to (1) Measure, for each of the light-receiving signals R1 to RN, the time required for the laser light to travel to a corresponding distance measurement point and return to the laser radar 3

(2) Calculate the measurement point distance from the laser radar 3 to each distance measurement point based on the time taken for the laser light to travel to the corresponding distance measurement point and return to the laser radar 3.

The present disclosure is however not limited to this configuration.

Specifically, the distance measurement unit 15 can be configured to (1) Measure, for each of the light-receiving signals R1 to RN, the difference in phase between the laser light and an echo based on reflection the laser light from a corresponding distance measurement point (2) Calculate the measurement point distance from the laser radar 3 to each distance measurement point based on the measured phase difference for the corresponding one of the light-receiving signals R1 to RN.

The functions of one element in the present embodiment can be distributed as plural elements, and the functions that plural elements have can be combined into one element. At least part of the structure of the present embodiment can be replaced with a known structure having the same function as the at least part of the structure of the present embodiment. A part of the structure of the present embodiment can be eliminated as long as the remaining structure of the present embodiment is capable of solving the problem. At least part of the structure of the present embodiment can be added to or replaced with the structures of the modifications. All aspects included in the technological ideas specified by the language employed by the claims constitute embodiments of the present invention.

The present disclosure can be implemented by various embodiments in addition to the object recognition apparatus 1; the various modification include programs for running a computer to serve as the control unit 5, storage media storing the programs, and object recognition methods.

What is claimed is:

1. An object recognition apparatus mountable to a vehicle, the object recognition apparatus comprising:
a light-emitting unit for emitting laser light;
a light-receiving unit for receiving reflected waves, the reflected waves being based on reflection of the laser light from corresponding distance measurement points of an object to be recognized;
a distance calculation unit that calculates a distance to each of the distance measurement points, based on a corresponding one of the reflected waves;
a direction estimating unit that estimates a direction of each of the distance measurement point with respect to the vehicle, based on the reflected waves;
an object recognition unit that recognizes a predetermined recognition region of the object to be recognized, based on the distance measurement points;
a high-illuminance direction acquisition unit that acquires, as a high-illuminance direction range, a range of at least one high-illuminance direction, the at least one high-illuminance direction being a direction in which an intensity of light received by the light-receiving unit is equal to or greater than a predetermined threshold value without the reflected waves being received by the light-receiving unit; and
a correction unit that performs a correction task to correct the recognition region of the object such that, as viewed from the vehicle, a corrected recognition region of the object includes at least part of the high-illuminance direction range on condition that:
the recognition region of the object and the high-illuminance direction range have a predetermined positional relationship therebetween.

2. The object recognition apparatus according to claim 1, wherein:
the recognition region of the object has first and second edges in a direction parallel to a longitudinal direction of the vehicle, the first edge being closer to the high-illuminance direction range than the second edge; and
an angle formed between the first edge of the recognition region of the object and the high-illuminance direction range is smaller than a predetermined threshold angle.

3. The object recognition apparatus according to claim 1, wherein:
the recognition region of the object has first and second edges in a direction parallel to a longitudinal direction of the vehicle, the first edge being closer to the high-illuminance direction range than the second edge;
the at least one high-illuminance direction comprises a plurality of high-illuminance directions, the plurality of high-illuminance directions having first and second edge directions in the direction parallel to the longitudinal direction of the vehicle, the first edge direction being closer to the recognition region of the object than the second edge direction; and
an angle formed between the first edge of the recognition region of the object and the first edge direction of the high-illuminance direction range is smaller than a predetermined threshold angle.

4. The object recognition apparatus according to claim 1, further comprising:
an illuminance acquisition unit that acquires an ambient illuminance of the vehicle,
wherein the correction unit performs the correction task on condition that the illuminance acquired by the illuminance acquisition unit is less than a predetermined threshold value.

5. The object recognition apparatus according to claim 1, further comprising a lateral determination unit that:
determines whether a first condition and a second condition are satisfied,
the first condition being that the recognition region of the object is positioned laterally with respect to the vehicle,
the second condition being that the high-illuminance direction range is farther than the recognition region of the object along a travel direction of the vehicle; and
determines that the recognition region of the object recognized by the object recognition unit corresponds to a lateral vehicle with respect to the vehicle upon determining that the first and second conditions are satisfied.

6. The object recognition apparatus according to claim 5, wherein:
the correction unit is configured to enlarge, as the correction task, the recognition region of the object in at least one of the travel direction of the vehicle and a width direction of the vehicle when the lateral determination unit determines that the recognition region of the object recognized by the object recognition unit corresponds to the lateral vehicle.

7. The object recognition apparatus according to claim 6, wherein:
the correction unit is configured to enlarge the recognition range of the object in at least one of the travel direction and the width direction such that an enlarged amount of the recognized object region is equal to or smaller than a predetermined upper limit.

8. The object recognition apparatus according to claim 1, further comprising:
an object estimation unit that estimates that the object to be recognized exists in at least part of the high-illuminance direction range when the object recognition unit does not recognize the recognition region of the object to be recognized and the high-illuminance direction acquisition unit acquires the high-illuminance direction range.

9. An object recognition method comprising:
emitting laser light using a light-emitting unit;
receiving reflected waves, the reflected waves being based on reflection of the laser light from corresponding distance measurement points of an object to be recognized;
calculating a distance to each of the distance measurement points, based on a corresponding one of the reflected waves;
estimating a direction of each of the distance measurement point with respect to the vehicle, based on the reflected waves;
recognizing a predetermined recognition region of the object to be recognized, based on the distance measurement points;
acquiring, as a high-illuminance direction range, a range of at least one high-illuminance direction, the at least one high-illuminance direction being a direction in which an intensity of light received by the light-receiving unit without the reflected waves being received by the light-receiving unit is equal to or greater than a predetermined threshold value; and
correcting the recognition region of the object such that, as viewed from the vehicle, a corrected recognition region of the object includes at least part of the high-illuminance direction range on condition that:

the recognition region of the object and the high-illuminance direction range have a predetermined positional relationship therebetween.

* * * * *